United States Patent
Frank et al.

(10) Patent No.: US 8,286,324 B2
(45) Date of Patent: *Oct. 16, 2012

(54) BLIND RIVET AND ASSOCIATED DEVICE

(75) Inventors: Uwe Frank, Windischenbach (DE); Marcel Strobel, Bretzfeld (DE)

(73) Assignee: Adolf Wuerth GmbH & Co. KG, Kuenzelsau (DE)

( * ) Notice: Subject to any disclaimer, the term of this patent is extended or adjusted under 35 U.S.C. 154(b) by 874 days.

This patent is subject to a terminal disclaimer.

(21) Appl. No.: 12/278,811

(22) PCT Filed: Feb. 12, 2007

(86) PCT No.: PCT/EP2007/001152
§ 371 (c)(1),
(2), (4) Date: Nov. 13, 2008

(87) PCT Pub. No.: WO2007/090681
PCT Pub. Date: Aug. 16, 2007

(65) Prior Publication Data
US 2009/0217507 A1    Sep. 3, 2009

(30) Foreign Application Priority Data

Feb. 12, 2006    (DE) .................. 10 2006 007 707
Feb. 12, 2006    (DE) .................. 10 2006 007 708

(51) Int. Cl.
*B21J 15/02*    (2006.01)
*F16B 13/06*    (2006.01)
*B23P 11/00*    (2006.01)

(52) U.S. Cl. ............... 29/525.06; 411/43; 29/243.53

(58) Field of Classification Search ............... 29/524.1, 29/525.06, 243.53; 411/43
See application file for complete search history.

(56) References Cited

U.S. PATENT DOCUMENTS

| | | | |
|---|---|---|---|
| 3,178,989 A | 4/1965 | Siebol | |
| 3,691,924 A | 9/1972 | Baker | |
| 4,089,099 A | 5/1978 | Nivet | |
| 2006/0251489 A1 | 11/2006 | Denham et al. | |
| 2008/0107499 A1 | 5/2008 | Denham et al. | |
| 2009/0217505 A1* | 9/2009 | Frank et al. | 29/524.1 |

FOREIGN PATENT DOCUMENTS

| | | |
|---|---|---|
| AU | 541854 B2 | 12/1980 |
| EP | 1 090 591 A2 | 4/2001 |
| EP | 1 396 646 A1 | 3/2004 |

(Continued)

*Primary Examiner* — John C Hong
(74) *Attorney, Agent, or Firm* — Boyle Fredrickson, S.C.

(57) ABSTRACT

The invention relates to a blind rivet and a device for placing the blind rivet. The blind rivet contains a rivet head with a collar at one end and a rivet tip at the other. The rivet body contains a cavity in the form of a bore in a sleeve section. As with other blind rivets, the blind rivet is inserted into an opening in two sheets that are to be joined together, until the collar comes to rest on the upper face of the upper sheet. In a second step, the part of the rivet body or the rivet head that lies on the rear face of the two sheets is deformed with the aid of a hammer or expanding body, which is advanced with a percussive-type action in the same direction. A device for placing a rivet of this type contains a part that can be pushed forwards with a percussive-type action, this part consisting of a hammer for exerting pressure on the expansion body.

27 Claims, 4 Drawing Sheets

FOREIGN PATENT DOCUMENTS

Figure 1:
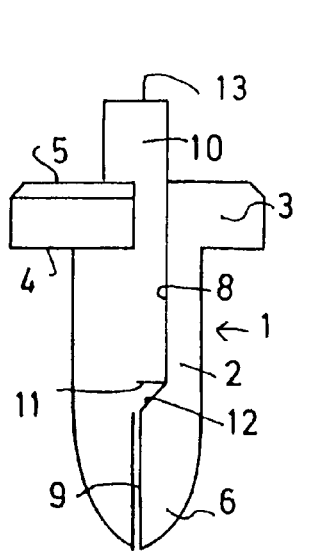

| | | |
|---|---|---|
| EP | 1 402 974 A2 | 3/2004 |
| EP | 1 396 646 B1 | 4/2007 |
| FR | 1353167 A | 1/1964 |
| FR | 1 353 167 | 2/1964 |
| FR | 2 384 148 | 10/1978 |
| GB | 1 356 538 A | 6/1974 |
| JP | 48-090068 | 10/1973 |
| JP | 2000-046023 | 2/2000 |
| WO | 2004102015 A1 | 11/2004 |

\* cited by examiner

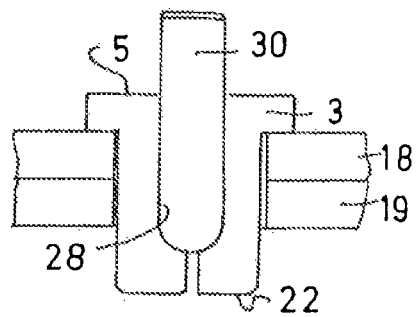
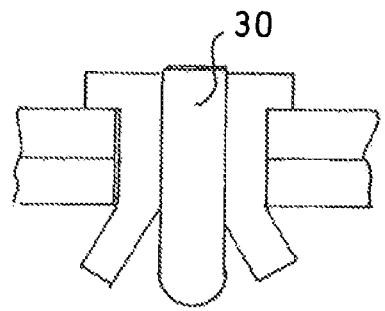
FIG. 6    FIG. 7
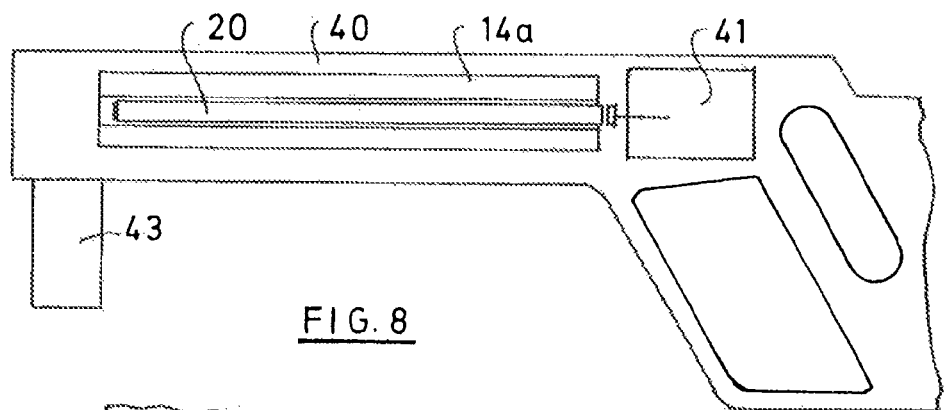
FIG. 8
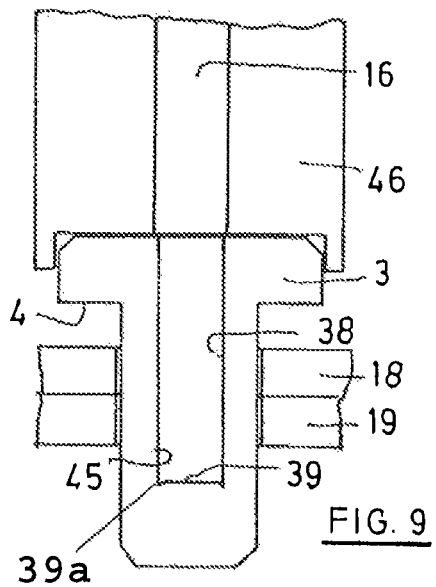
FIG. 9

BLIND RIVET AND ASSOCIATED DEVICE

The invention relates to a blind rivet, a device, and a method for placing said rivet.

Hollow rivets have long been known. They are used for fastening together two components by a riveting operation, where access to the rear surface of the components involved is not required. Hollow rivets are thus particularly suitable for use whenever the rear surface of the components to be fastened together is inaccessible. Common types of hollow rivets require that the components to be fastened together be provided with holes, through which the rivet body is inserted. A riveting mandrel that deforms the rivet on their far side may then be drawn forward from their front surface in order to form a rivet head.

Configuring the tip of the mandrel that protrudes from the rivet's far end in the form of an autodrilling tip in order that drilling procedures utilising a suitable tool may be performed in conjunction with a single operation that also includes the riveting operation is already known.

In the case of all known blind rivets, part of the mandrel forming the blind rivet must be drawn once the blind rivet has been emplaced in order to effect the actual riveting operation. That relatively long mandrel, which is gripped by a tool for drawing it, is subsequently either discarded or drops off in the vicinity of the location where the riveting was performed.

Also known are bucked rivets, where a mandrel having a pointed tip is inserted into a bore in a collar and the blunt end of the mandrel protrudes from the top of the collar, is employed. Such rivets are driven in by a hammer blow, where the hammer's head strikes the protruding end of the mandrel. However, that hammer blow is incapable of accurately splitting the forces involved into an initial, exclusively driving force, followed by a bucking force (cf. U.S. Pat. No. 3,691,924).

The invention is based on the problem of improving the features of blind rivets such that no waste that must be separately disposed of will originate from completed riveting operations.

In order to solve that problem, the invention proposes a blind rivet having those features stated in claim 1 and a blind rivet having those features stated in claim 2. Elaborations on the invention are covered by the dependent claims.

The blind rivet proposed by the invention thus has a rivet body having a collar that forms an engagement surface, with which the blind rivet abuts against the upper surface of one of the components to be fastened together. The rivet body also has a tip that, for example, is inserted through the holes in the components to be fastened together and protrudes sufficiently far from the far side thereof. However, if the blind rivet is inserted into a hole in a component whose thickness exceeds the length of that portion of the blind rivet protruding from the collar's engagement surface, it will fail to protrude from the other side of the component. The blind rivet also has a central, engagement surface that is acted upon in order to deform that portion of the rivet body that is either arranged on the far side of the components to be fastened together or remains enclosed in a hole.

The action effecting the deformation may, for example, be a percussive motion along the direction in which the blind rivet was inserted into the holes in the components to be fastened together, which represents one means for forming a rivet head on the far side thereof or within the holes therein.

Another means proposed by the invention for accomplishing that task is drawing on the engagement surface. In that case, for example, a plunger or drawing component is therefore temporarily joined to the engagement surface and a drawing motion applied to such an engagement surface. Once the rivet head has been set, the joint between the plunger or drawing component and the engagement surface may be broken.

In either case, no mandrel that has been previously attached to the rivet will be required, which means that no waste will be subsequently generated.

The central engagement surface that is to be acted upon in order to deform the rivet body's tip may, for example, be formed on the rim of a cavity in the rivet body. The depth of that cavity might, for example, equal the overall thickness of the pair of components to be fastened together. However, that engagement surface might also be arranged closer to the far end of the blind rivet's collar.

The central engagement surface might also be formed by a tapered section of a cavity in the rivet body or on a tapered section of a cavity, and such is covered by the invention.

According to an elaboration on the invention, it may be provided that the engagement surface is acted upon by a plunger of a setting tool. In that case, the cavity is dimensioned such that such a plunger may enter it. A hole will then remain in the rivet body's tip once the riveted joint has been generated and the plunger has been separated.

Another means proposed by the invention for setting blind rivets involves arranging an expansion body that has an end associated with the central engagement surface that faces away from the latter situated in the cavity in the rivet body. The setting tool's plunger may then act upon that end of the expansion body that faces away from the central engagement surface.

It will be particularly sensible if the expansion body is both arranged in the cavity and attached such that it cannot drop out of the rivet body, which may be arranged by providing for a light clamping action. Of course, that clamping action should not be such that it will prevent the expansion body from being driven inward.

Under a further elaboration on the invention, it may be provided that, in the unexpanded status of the blind rivet, the expansion body protrudes from the annular engagement surface on the rivet body's collar. The protruding section thereof may be used for acting upon the blind rivet while it is held in a setting tool. This embodiment may also be used for checking the rivet for proper setting, since no portion thereof will protrude if it has been properly set. On the contrary, in the most sensible case, the end of the expansion body will be flush with the collar's surface.

According to the invention, it may also be provided that the cavity continues beyond its tapered section in the form of a narrow slot, or in some other form, in order to ease, or promote, the deformation of the rivet body's tip.

We have thus far described how the blind rivet according to the invention might be configured if its deformation is to be accomplished by means of interventions acting along the direction, along which pressure is exerted thereon. However, as stated above, the rivet head might also be formed by acting on the central engagement surface, along the drawing direction. In the latter case, the invention proposes forming the central engagement surface for the purpose of attaching a tie rod thereto such that the latter will be capable of withstanding tensile forces acting thereon. Similarly to the case where the engagement surface is acted upon by a plunger, that implies that the cavity in the rivet body must be configured such that a tie rod may be inserted therein until it contacts the central engagement surface. The benefit in cases employing a tie rod that is also released once the riveted joint has been generated is that no waste will be generated. The tie rod, which is part of the setting tool, may be reused until it has become worn to the point where it is no longer suitable for reuse.

According to the invention, it may be provided that the rivet body has a noncircular cross-section or protrusions on the collar's planar underside that are intended to highly reliably prevent the rivet from rotating when a torque is exerted thereon.

The invention also proposes a method for manufacturing blind rivets, under which a rivet is manufactured in the form of a hollow rivet and provided with a collar in the vicinity of one of its ends. The rivet body is provided with an additional, central engagement surface for a tool. That section of the rivet body situated between its far end and the central engagement surface is configured such that a percussive action exerted on the engagement surface causes a deformation of that section thereof. That configuration may be implemented by providing cavities, predefined buckling points, suitable choices of materials, or suitable treatments of the materials involved.

The invention further proposes a method for setting blind rivets, under which a blind rivet provided with a tip is inserted into mutually aligned holes in two components to be fastened together until the underside of its collar abuts against the uppermost surface thereof, whereupon that section of the rivet body situated between that engagement surface and the rivet body's tip is then deformed by actions exerted on a central engagement surface in order to form a rivet head.

Under an elaboration thereon, it may be provided that pressure is exerted on the central engagement surface once the blind rivet has been placed. That exertion proceeds jerkily.

Drawing on the central engagement point is also feasible, and covered by the invention. Drawing may also proceed gradually, since the drawing tool may abut against the top of the rivet body.

Drawing may proceed such that a tie bolt is inserted into the cavity in the blind rivet until it abuts against the base thereof and joined to the base of the recess therein. The tie bolt is then withdrawn from the rivet body while the drawing tool abuts against the latter in order to deform the rivet. The tie bolt may then be separated from the central engagement point.

For example, a cold-welding process may be performed in order to join the tie bolt to the rivet body.

Employing resistance welding for that purpose is also feasible, and covered by the invention.

Screwing the tie bolt into the base of the recess in order to join it to the gun rivet and then unscrewing it therefrom following drawing are also feasible.

The invention also proposes a device for setting blind rivets. That device incorporates a holder for holding a blind rivet in a certain orientation, a plunger arranged coaxially to the blind rivet, and a drive for percussively advancing the plunger. That drive may preferably have a device for triggering that advancing motion. The holder is configured such that the blind rivet is aligned on the plunger such that the plunger may either enter the cavity in the blind rivet or engage an expansion body protruding from the blind rivet.

Explosive combustion of a gas or explosive charge may be employed as the drive for the plunger, as may a gas-pressure spring equipped with a clamping device, an oil-pressure spring equipped with a clamping device, a compression spring equipped with a clamping device, or even compressed air.

A power source, for example, a rechargeable battery, an electric power cable for connecting the advancing drive to a power line, compressed air, or a hydraulic system, may be employed for pretensioning the advancing drive.

Under an elaboration on the invention, it may be provided that the device has a tubular holder body in the vicinity of its far end that is also capable of advancing when the device is actuated by the drive. That holder body may also be used for holding the blind rivet while it is being inserted into the holes in the components to be fastened together. The device may also have a tie bolt arranged coaxially to the advancement body that may be advanced and retracted by the drive. The device incorporates a device for joining the tie bolt to the base of a recess in the blind rivet. The device also incorporates a device for breaking the joint between the tie bolt and blind rivet.

Under a further elaboration on the invention, the device may have a device for rotating the tie bolt.

The device may have a device for cold-welding the tie bolt to the rivet body. That device may operate such that it rotates the tie bolt under pressure while it abuts against the blind rivet's central engagement surface.

Equipping the device with a device for resistance-welding the tie bolt to the blind rivet is also feasible.

The device may, for example, rotate the tie bolt in order to shear off the joint between the tie bolt and the rivet body and separate the tie bolt from the rivet body.

It will be particularly sensible if the device incorporates a magazine for accommodating several blind rivets.

Figure 2:
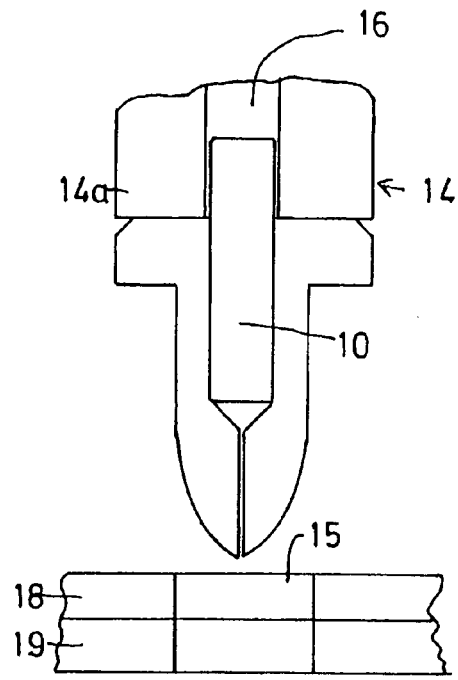
Figure 3:
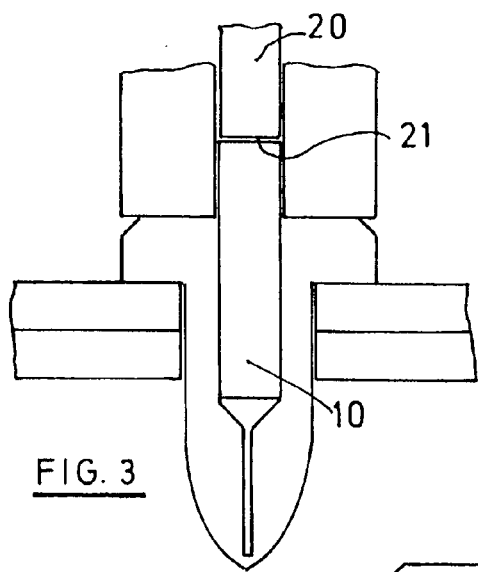
Figure 4:
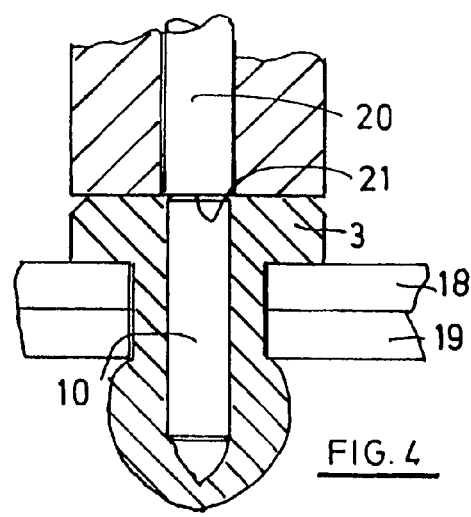
Figure 5:
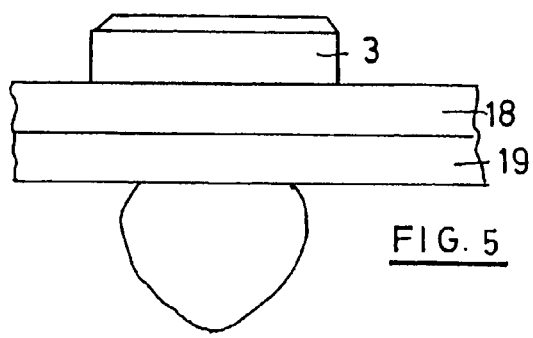
Figure 10:
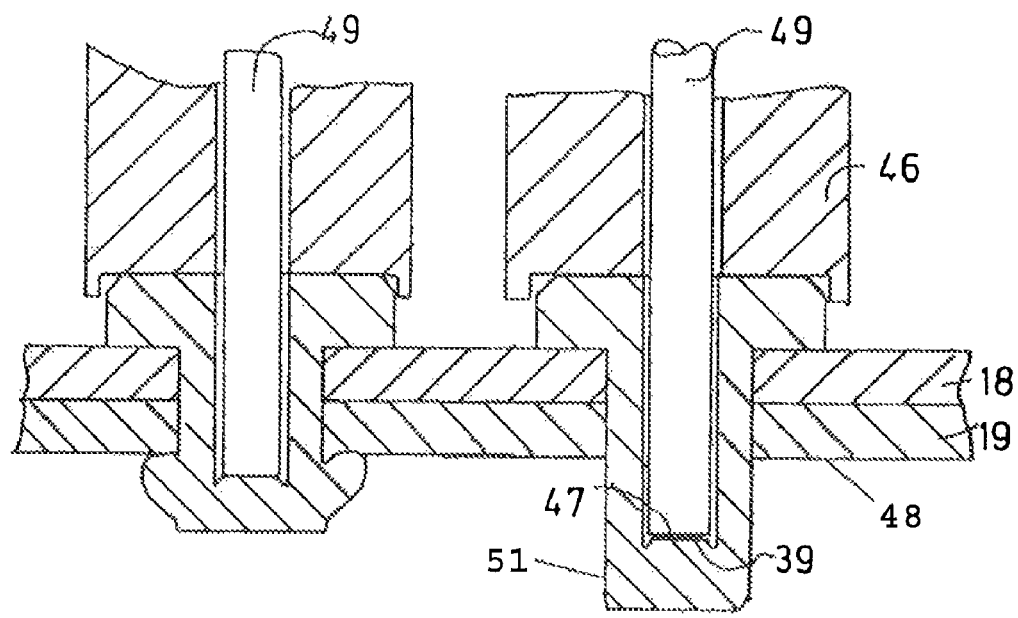
Figure 11:
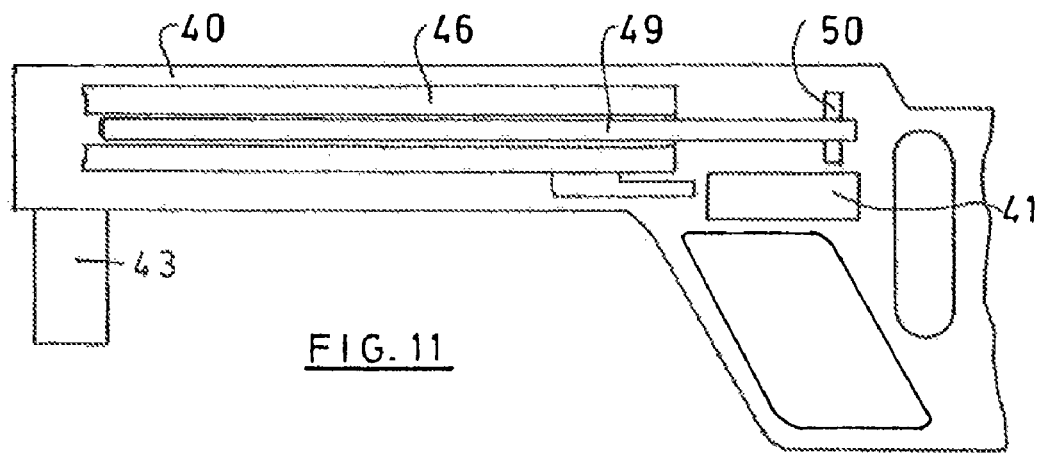
Figure 12:
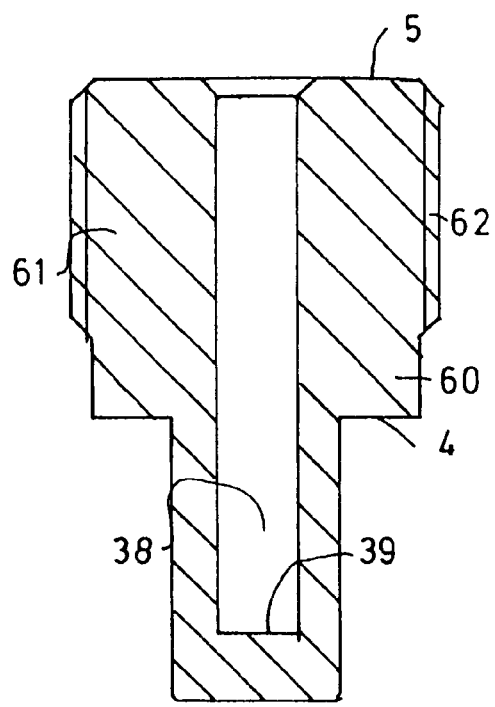
Figure 13:
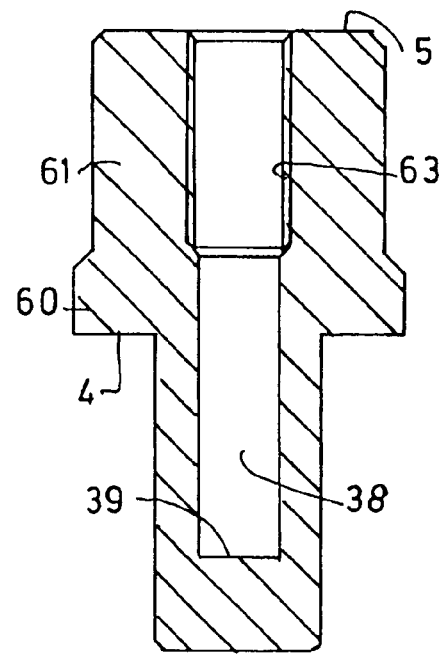

Further features, details, and benefits of the invention arise from the claims and the abstract, the wording of both of which is herewith made an integral part of the content of the description by way of reference thereto, the following description of a preferred embodiment of the invention, and the drawings, which depict:

FIG. 1 a partially sectioned view of a blind rivet according to a first embodiment of the invention;

FIG. 2 a section through the blind rivet shown in FIG. 1, prior to its insertion into a hole;

FIG. 3 a view of the inserted blind rivet, prior to its expansion;

FIG. 4 the status of the blind rivet following its expansion;

FIG. 5 the result of the riveting operation;

FIG. 6 a view, corresponding to that of FIG. 3, of a second embodiment;

FIG. 7 a view, corresponding to that of FIG. 4, of the blind rivet shown in FIG. 6;

FIG. 8 a greatly simplified view of a rivet-setting device for setting blind rivets according to the invention;

FIG. 9 a view, corresponding to that of FIG. 2, of another blind rivet;

FIG. 10 two subsequent stages in setting the blind rivet shown in FIG. 9;

FIG. 11 a schematised view of a setting device for the blind rivet shown in FIG. 9;

FIG. 12 an axially sectioned view of a blind rivet having an external thread;

FIG. 13 an axially sectioned view of a blind rivet having an internal thread.

The left-hand half of FIG. 1 depicts a side view of a blind rivet according to a first embodiment of the invention, and its right-hand half depicts a longitudinally sectioned view thereof. The blind rivet incorporates a rivet body 1 whose centre section has the shape of a sleeve 2. A collar 3 having a planar underside 4 is formed on the upper, in FIG. 1, end of the rivet body 1. Its underside 4 is that side thereof extending outward from the sleeve-shaped section 2. A planar upper surface 5 that may be utilized as an annular engagement surface for a tool is formed on that side of the collar opposite its underside 4.

On that end of the rivet body opposite the collar 3, its central, sleeve-shaped section 2 runs out onto a terminal section 6, in that the rivet body 1 has a gradually diminishing cross-section.

A cylindrical cavity 8 that could be termed a "bore," provided that the fact that it need not necessarily be drilled is ignored, is formed inside the sleeve-shaped section 2. However, the cavity has the shape of a bore, that is, a circular cross-section that remains constant over its full length. The end of the cavity 8 has a tapered section 12 that then merges with a narrow slot 9. Its far end may have a joint connecting the pair of sections situated on either side of the slot 9 in order that the slot 9 will be closed at the rivet body's tip.

An expansion body 10 that contacts the rim of the cavity 8 and is retained therein by a certain clamping action is arranged within the cavity 8. It is retained therein such that cannot fall out during handling of the blind rivet. That end 11 thereof that faces the bottom of the cavity 8 abuts against its inner surface roughly at the onset of its tapered section 12. The opposite, outer end 13 of the expansion body 10 protrudes markedly beyond the annular upper surface 5 of the collar 3. The expansion body might also be positioned such that it extends a lesser distance into the cavity 8.

FIG. 2 depicts the mutual arrangement of a blind rivet and a tool 14 that is depicted in greatly simplified form. The blind rivet may be held in the tool 14 in a manner that had not been depicted in any detail in order that it may be inserted into holes 15 in two overlain pieces of sheet metal 18, 19 by handling it with the tool 14. The tool 14 incorporates a bore 16 that is dimensioned such that the sleeve-shaped portion 14a of its far end may engage the expansion body 10, bypassing the upper surface 5 of the collar 3. As mentioned above, under that mutual arrangement, the blind rivet will be driven through the bore 16 and arrive at the position depicted in FIG. 3. A plunger 20 will then be abruptly driven forward, through the bore 16 in the tool 14 under a further operating procedure. The far end 21 of the plunger 20 will strike the outer end 13 of the expansion body 10 and drive it forward, into the interior of the cavity 8. That status is depicted in FIG. 3.

When the far end 11 of the expansion body 10 strikes the tapered section 12 on the far end of the cavity 8, the two or more sections of the rivet body's far end 6 will be bent outward, which will be facilitated by the presence of the slot 9, Since the two or more sections of its far end 6 are joined at their far ends, they cannot be torn apart, and form a rivet head 22, as depicted in FIG. 4. In that status, the outer end 13 of the expansion body 10 lies in the same plane as the upper surface of the rivet body's collar 3. The interior of the rivet head 22 that has formed will be reinforced by the expansion body 10. The tool is then removed and a riveted joint resembling that appearing in the side view depicted FIG. 5 will have been generated. The expansion body 10 will no longer protrude from the visible upper surface 5 of the collar 3. If the riveted joint is viewed from above, i.e., looking down from the top of FIG. 5, whether its outer end 13 is flush with the upper surface 5 of the collar will be readily recognizable. If it has penetrated too far into the rivet body, under some circumstances, that may be concluded that there was too little resistance counteracting the advancing motion, which might indicate that its joint with the rivet body was insufficiently rigid. The expansion body 10 thus represents a means for checking the setting of the blind rivet.

FIGS. 6 and 7 depict a second embodiment of a blind rivet according to the invention. In this case as well, the rivet body incorporates a protruding collar 3 having a planar underside 4 and a planar upper surface 5. A cavity 28 that, here again, is cylindrical and has a constant diameter and a rounded rim, is formed in the rivet body's sleeve-shaped section. The sleeve-shaped section 2 terminates on a planar end of rivet head 22 that is parallel to the upper surface 5 of the collar 3 situated opposite it. In this case, the expansion involves the rounded far end of the expansion body 30 spreading the split end of the sleeve-shaped section 2 on the far side of the pieces of sheet metal 18, 19, as depicted in simplified form in FIG. 7.

FIG. 8 depicts a greatly simplified view of a setting tool, with which the blind rivet according to the invention may be set. The setting tool incorporates a holding body 14a that, in the case of the example shown, has a tubular shape over its entire length, enclosed in a housing 40 and mounted such that it may be longitudinally translated within the housing 40. The plunger 20 resides within the holding body 14a and is also longitudinally translatable. A drive 41 that, as its designation implies, is capable of driving both components, namely, the holding body 14a and the plunger 20, is arranged in the housing 40 in order to drive them forward. The drive for the plunger 20 is configured such that it is capable of abruptly driving the expansion body 30 forward, since the plunger 20 must supply the deforming force.

A magazine 43, in which a row of blind rivets that will be taken from the magazine 43 and inserted into the tool's forward section are accommodated in order that they may be aligned on the plunger 20, is arranged on the side of the housing 40.

The blind rivet depicted in FIG. 9 is configured similarly to those depicted in FIGS. 1 through 7. However, contrary to the latter, in this case, the cavity 38 therein is cylindrical over its full length, i.e., all the way down to its base 39. Its base 39 has a recess 39a running around its edge, i.e., where it joins the wall 45, in order that the central section of the base 39 will be slightly elevated with respect to its edge. Otherwise, the blind rivet depicted in FIG. 9 is configured similarly to the embodiments described above. The blind rivet is gripped by a holding body 46 and pushed through the holes 15 in the two pieces of sheet metal 18, 19 until the planar underside 4 of the collar 3 abuts against the upper surface of the sheet metal. The holding body 46 has a bore 16, through which a component may be may be driven, as is depicted in FIG. 10, where attention is initially directed to the right-hand half of FIG. 10. A tie rod 49 is driven through the tool's bore 16 until the end 47 of the tie rod 49 contacts the base 39 of the cavity 38 in the blind rivet. Those two surfaces are then joined employing, for example, resistance welding. The tie rod 49 is then drawn, which will cause the far end of the blind rivet, i.e., the section between rear surface 48 of the two pieces of sheet metal 18, 19 to be fastened together and the tip 51 of the blind rivet, to deform. In that particular case of drawing on the tip 51 of the blind rivet, the tool and holding body 46 may abut against the upper surface of the collar. The result is depicted on the left-hand half of FIG. 10. The tie rod 49 is then separated from the blind rivet by, for example, rotating the tie rod, which will shear it off.

FIG. 11 depicts a tool, with which blind rivets according to FIG. 9 may be set. The holding body 46 is arranged in the housing 40 such that it may be axially translated therein. Its sole purpose is guiding blind rivets during insertion and acting as an abutment for the tool during drawing of the tie rod 49. A drive 41 is provided for advancing the holding body 46; a drive, which is not shown, is also provided for advancing and retracting the tie rod 49. The tie rod 49 may also be rotated, and a symbol for a gear 50 to be used for that purpose has been included.

The blind rivets depicted in FIGS. 12 and 13 depict further options for implementing the invention. In either example, the blind rivet, once again, incorporates a collar 3 having an essentially planar underside 4, which is to be interpreted as meaning that its underside 4 may have ribs, individual protrusions, or similar that may penetrate the surface of the component to be fastened by the blind rivet when the rivet is inserted. Such a configuration may also be used for manufacturing a collar for securing the rivet against rotation. That the essentially planar underside 4 of the collar is slightly domed in order that its rim will dig into the component's surface is also feasible. All those configurations that differ slightly from a mathematical plane should be regarded as falling under the term "essentially planar underside 4."

In the case of either of those embodiments, the collar is much thicker than those of the sample embodiments described thus far in order to increase the distance between its engagement surface 5 and its essentially planar underside 4. In this case as well, the engagement surface 5 has an annular shape in order that it will surround the cavity 8 within the blind rivet. The collar has a first section 60, within which it has a hexagonal surface contour, adjoining its underside 4. That hexagonal shape of the section 60 of the collar 3 might also appear on the blind rivet depicted in FIG. 13. A second section 61, where the collar is cylindrical and has an external thread 62, adjoins that first section 60. The engagement surface 5, which, in the case of the example shown, is planar, might also be domed. The same applies to the engagement surfaces on the other embodiments.

The hexagonal section 60 might be used for accommodating a wrench.

In the case of the embodiment depicted in FIG. 10, an internal thread 63 is cut into that section of the hole in the thickened collar 3 adjoining the engagement surface 5.

The blind rivet depicted in FIGS. 12 and 13 may be used for fastening objects to it once it has been set, using either the external thread 62, in the case of the embodiment according to FIG. 12, or using the internal thread 63, in the case of the embodiment according to FIG. 13. A wrench may be used to hold its hexagonal section 60 stationary while objects are being screwed onto it in order to prevent it from rotating, and thus loosening, when large torques are exerted on it. Similarly, that portion of the blind rivet's shank that is to be inserted into the hole, i.e., the section situated between its tip and the planar underside 4 of the collar, may have a noncircular cross-section.

Expanding their far end of blind rivets onto the rear surface of a component to which they are to be fastened will be unnecessary whenever they may be used for more than merely fastening two pieces of sheet metal together and may also be used for fastening themselves to some object. Their expansion within the hole or bore in the component whenever the component to which they are to be fastened is thick enough is also feasible and covered by the invention. Spreading their far end outward may also take place within a hole, even a blind hole.

Although the base 39 of the recess 38 has a smaller diameter than the recess 38 in the case of the embodiment according to FIG. 9, that is not the case for the embodiment according to FIGS. 12 and 13, where the base 39 is configured without a circumferential recess. In the latter case, a tie rod whose tip is chamfered in order that it will have a smaller contacting surface that will ease shearing it off following deformation procedures may be used for deforming them.

Furthermore, the recess 38 need not have a constant cross-section and may also be slightly tapered.

Whenever the term "sheet metal" is employed in the text of the description, it should be regarded as merely an example illustrating that two components fabricated from arbitrary materials might be fastened together using the blind rivet according to the invention. It might also be used for fastening a single component to another component, for example, fastening a hook to a board. Usage of such hollow rivets might also be confined to fastening them to either a through hole or a blind hole in a component, which particularly applies to the embodiment depicted in FIGS. 12 and 13.

Regardless of whether the embodiment according to FIGS. 12 and 13 or the embodiment according to FIG. 9 are involved, the central engagement surface may be raised, i.e., shifted closer to the collar 3.

Blind rivets are usually configured such that they have circular cross-sections. However, employment of blind rivets having cross-sections other than circular cross-sections in order to allow their insertion into noncircular holes, which will allow securing them against rotation, is also feasible and covered by the invention.

The invention claimed is:

1. A blind rivet having
    a rivet body,
    a collar formed thereon having
    an at least approximately planar underside,
    a first engagement surface on an upper surface of the collar configured for supporting an external tool during an expansion operation, said surface being opposite an underside of the collar, and
    a second engagement surface disposed centrally in the rivet body with respect to the first engagement surface and configured for attachment of the external tool for a deformation operation,
    said second engagement surface being deformable in response to a drawing action exerted by the external tool on the second engagement surface that causes a laterally spreading deformation of a forward section of the rivet body which projects a distance beyond the underside of the collar.

2. A blind rivet according to claim 1, wherein the central engagement surface is formed on a rim of a cavity in the rivet body.

3. A blind rivet according to claim 1, wherein the central engagement surface is formed on a tapered section of a cavity in the rivet body.

4. A blind rivet according to claim 1, wherein the central engagement surface is formed on a tapered section of a cavity in the rivet body.

5. A blind rivet according to claim 1, wherein the central engagement surface may be engaged by a plunger of a setting tool.

6. A blind rivet according to claim 1, wherein an expansion body having a far end associated with the central engagement surface situated opposite the latter is arranged in a cavity in the rivet body.

7. A blind rivet according to claim 6, wherein the expansion body protrudes from the engagement surface on the collar in the rivet body.

8. A blind rivet according to claim 1, wherein a cavity in the rivet body continues beyond a tapered section and extends to a far end of a tip of the rivet.

9. A blind rivet according to claim 1, wherein the central engagement surface is configured for attachment of a tie rod, the tie rod being capable of withstanding tensile forces acting thereon.

10. A blind rivet according to claim 1, having a rivet body having at least one of a noncircular cross-section and protrusions on the underside of the collar.

11. A blind rivet according to claim 1, wherein the central engagement point is formed on a base of a recess.

12. A blind rivet according to claim 1, wherein the central engagement point is formed on a base of a recess and has a diameter less than that of a recess.

13. A blind rivet according to claim 1, wherein the collar includes a shoulder having a thread that provides an engagement surface.

14. A blind rivet according to claim 1, wherein the forward section of the rivet body is configured for expanding within a hole.

15. A blind rivet according to claim 1, wherein a central engagement surface is formed on a rim of a cavity in the rivet body.

16. A method for setting blind rivets, wherein
- a blind rivet is inserted into a component until an underside of a collar abuts against the upper surface of the component,
- a tie bolt is introduced into a recess in the blind rivet until the tie bolt abuts against a base of the blind rivet,
- the tie bolt is joined to the base of the recess,
- a tensile force is exerted on the tie bolt in order to deform the rivet, and
- the tie bolt is separated from the blind rivet once the deformation has been concluded, once a rivet head has been formed.

17. A method according to claim 16, wherein a cold-welding technique is employed in order to create the joint.

18. A method according to claim 16, wherein resistance welding is performed in order to create the joint.

19. A method according to claim 16, wherein capacitor-discharge welding is performed in order to create the joint.

20. A method according to claim 16, wherein the tensile force is exerted on the blind rivet while it abuts against a mating component.

21. Apparatus for setting blind rivets having
- a holder for holding a blind rivet,
- a holder body, at least a forward section of which is tubular,
- a drive for advancing the holder body,
- a tie bolt arranged coaxially to the holder body,
- a drive for advancing and retracting the tie bolt,
- a first device for joining the tie bolt to a base of a recess in the blind rivet, and
- a second device for breaking a joint between the tie bolt and the blind rivet.

22. Apparatus according to claim 21, having a device for rotating the tie bolt.

23. Apparatus according to claim 21, having a cold-welding device.

24. Apparatus according to claim 21, having a device for resistance-welding the tie bolt to the blind rivet.

25. Apparatus according to claim 21, having a device for capacitor-discharge welding the tie bolt to the blind rivet.

26. Apparatus according to claim 22, wherein the device for rotating the tie bolt acts as a device for shearing it off.

27. Apparatus according to claim 22, having a magazine for accommodating and supplying several blind rivets.

* * * * *